United States Patent [19]
Yamamoto et al.

[11] Patent Number: 5,391,648
[45] Date of Patent: Feb. 21, 1995

[54] POLYORGANOSILOXANE GRAFT COPOLYMERS

[75] Inventors: Naoki Yamamoto; Akira Nakata; Atsunori Koshirai, all of Otake, Japan

[73] Assignee: Mitsubishi Rayon Co., Ltd., Tokyo, Japan

[21] Appl. No.: 12,452

[22] Filed: Feb. 2, 1993

Related U.S. Application Data

[63] Continuation-in-part of Ser. No. 728,367, Jul. 11, 1991, abandoned, and a continuation-in-part of Ser. No. 845,704, Mar. 4, 1992, abandoned.

[30] Foreign Application Priority Data

| Jul. 24, 1990 | [JP] | Japan | 2-195267 |
| Mar. 6, 1991 | [JP] | Japan | 3-039904 |
| Apr. 3, 1991 | [JP] | Japan | 3-070948 |
| Apr. 4, 1991 | [JP] | Japan | 3-071790 |

[51] Int. Cl.[6] .................................................. C08F 283/12
[52] U.S. Cl. ........................................................ 525/479
[58] Field of Search ............................................ 525/479

[56] References Cited

U.S. PATENT DOCUMENTS

| 3,519,702 | 7/1970 | Wear et al. |
| 4,174,358 | 11/1979 | Epstein |
| 4,536,541 | 8/1985 | Latham |
| 4,673,718 | 6/1987 | Ryntz et al. |
| 4,740,555 | 4/1988 | Dean et al. |
| 4,885,336 | 12/1989 | Boutni et al. |
| 4,902,742 | 2/1990 | Yamamoto et al. |
| 4,918,132 | 4/1990 | Hongo et al. ............ 524/504 |
| 4,939,205 | 7/1990 | Derudder et al. |
| 4,948,842 | 8/1990 | Olivier |
| 4,965,111 | 10/1990 | Pratt et al. |
| 5,008,342 | 4/1991 | Phadke |

FOREIGN PATENT DOCUMENTS

| 0246537 | 5/1987 | European Pat. Off. |
| 0308198 | 3/1989 | European Pat. Off. |
| 0332188 | 9/1989 | European Pat. Off. |
| 367219 | 5/1990 | European Pat. Off. |
| 61-106614 | 5/1986 | Japan |
| 61-235462 | 10/1986 | Japan |
| 63-202652 | 8/1988 | Japan |
| 64-75553 | 3/1989 | Japan |
| 64-75563 | 3/1989 | Japan |
| 2138360 | 5/1990 | Japan |
| 2245050 | 9/1990 | Japan |
| 916529 | 1/1963 | United Kingdom |

*Primary Examiner*—Melvyn I. Marquis
*Assistant Examiner*—D. Aylward
*Attorney, Agent, or Firm*—Cushman Darby & Cushman

[57] ABSTRACT

A polyorganosiloxane graft copolymer obtained by graft-polymerizing one or more kinds of monomer which have an ethylenically unsaturated bond and contain at least an epoxy group-containing vinyl monomer onto a compound rubber in which a polyorganosiloxane rubber and a polyalkyl (meth)acrylate rubber have been inseparably united with each other, and in which the component derived from the epoxy group-containing vinyl monomer occupies a proportion of 1 to 30 wt. % of the whole graft copolymer. This polyorganosiloxane graft copolymer is excellent in impact resistance, low-temperature characteristics and weather resistance, and also excellent in the bond strength to paint film applied thereto. This graft copolymer is also useful as adhesives, and particularly it exhibits excellent adhesion performance in depositing aromatic polymers such as polyesters (e.g. polyethylene terephthalate), polyphenylene oxides, polyphenylene sulfides, etc.

17 Claims, No Drawings

POLYORGANOSILOXANE GRAFT COPOLYMERS

CROSS-REFERENCE TO RELATED APPLICATION

This application is a continuation-in-part of U.S. patent applications Ser. No. 07/728,367, filed Jul. 11, 1991, now abandoned, and Ser. No. 07/845,704, filed Mar. 4, 1992.

BACKGROUND OF THE INVENTION

1. Field of the Invention

The present invention relates to a polyorganosiloxane graft copolymer excellent in impact resistance, low-temperature characteristics and weather resistance, and further giving molded products excellent in bond strength to paint film applied thereon.

2. Description of the Related Art

As thermoplastic resins excellent in impact resistance, low-temperature characteristics and weather resistance, a polyorganosiloxane graft copolymer obtained by graft-polymerizing a monomer having an ethylenically unsaturated bond (e.g. acrylonitrile, styrene) onto polyorganosiloxane rubber is disclosed in Japanese Patent Application Kokai No. 61-106614. Also, a graft copolymer obtained by graft-polymerizing particular amounts of an epoxy group-containing vinyl monomer and other vinyl monomer onto a polyorganosiloxane polymer copolymerized with a graft-linking agent as copolymer component is disclosed in Japanese Patent Application Kokai No. 2-138360.

However, the former graft copolymer disclosed in Japanese Patent Application Kokai No. 61-106614 has problems although it is excellent in impact resistance, low-temperature characteristics and weather resistance. Firstly, in the course of production of the graft copolymer, an organosiloxane oligomer which is very difficult to remove from the graft copolymer is produced as by-product. Secondly, when the graft copolymer is molded, this oligomer blooms out to the surface of the molded product, so that when the molded product is painted, the bond strength of the paint film is low. Similarly, the graft copolymer disclosed in Japanese Patent Application Kokai No. 2-138360 also has problems although it is excellent in impact resistance, low-temperature characteristics and weather resistance. That is, the adhesion property of paint film applied to the molded product of this graft copolymer is not of very high level, and besides the above adhesion property becomes quite poor as the amount of the polyorganosiloxane polymer in the graft copolymer becomes large. This graft copolymer further has a problem that when it is put in wet heat conditions under pressure, its impact strength becomes remarkably poor.

SUMMARY OF THE INVENTION

In view of the situation mentioned above, the present inventors have extensively studied to obtain a resin excellent in impact resistance, low-temperature characteristics, weather resistance and resistance to moist heat as well as in bond strength to paint film applied to the molded product of the resin. As a result, the present inventors have found that a polyorganosiloxane graft copolymer obtained by graft-polymerizing one or more kinds of monomer which have an ethylenically unsaturated bond and contain at least an epoxy group-containing vinyl monomer onto a compound rubber in which a polyorganosiloxane rubber and a polyalkyl (meth)acrylate rubber have been inseparably united with each other (hereinafter referred simply to as compound rubber) and besides containing a particular proportion of the component derived from the epoxy group-containing vinyl monomer, satisfies all of the performances described above. The present inventors thus attained to the present invention.

Further, this polyorganosiloxane graft copolymer is also useful as adhesives, and particularly it exhibits excellent adhesion performance in laminating aromatic polymers such as polyesters (e.g. polyethylene terephthalate), polyphenylene oxides, polyphenylene sulfides and the like. This polyorganosiloxane graft copolymer is very little deteriorated in impact strength when it is put in wet heat conditions under pressure, and therefore, it is usable in such conditions.

The gist of the present invention consists in a polyorganosiloxane graft copolymer obtained by graft-polymerizing one or more kinds of monomer which have an ethylenically unsaturated bond and contain at least an epoxy group-containing vinyl monomer onto a compound rubber in which a polyorganosiloxane rubber and a polyalkyl (meth)acrylate rubber have been inseparably united with each other, and in which the component derived from the epoxy group-containing vinyl monomer occupies a proportion of 1 to 30 wt. % of the whole graft copolymer.

DESCRIPTION OF THE PREFERRED EMBODIMENTS

The polyorganosiloxane rubber constituting the graft copolymer of the present invention can be obtained in the form of fine particle by emulsion polymerization of organosiloxane, a crosslinking agent for polyorganosiloxane rubber (hereinafter referred to as crosslinking agent (I)) and if necessary a graft-linking agent for the polyorganosiloxane rubber (hereinafter referred to as graft-linking agent (I)).

As the organosiloxane used to prepare the polyorganosiloxane rubber, three or more-membered cyclic organosiloxanes are used, among which three to six-membered ones are preferably used. Examples of such the cyclic organosiloxane include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane and the like.

As the crosslinking agent (I) used to prepare the polyorganosiloxane rubber, trifunctional or tetra-functional silanes, i.e. trialkoxyalkylsilanes or trialkoxyarylsilanes or tetraalkoxysilanes are used. Specific examples of such the crosslinking agent (I) include trimethoxymethylsilane, triethoxyphenylsilane, tetramethoxysilane, tetraethoxysilane, tetra-n-propoxysilane, tetrabutoxysilane and the like. Tetralkoxysilanes are preferred, among which tetraethoxysilane is particularly preferably used.

As the graft-linking agent (I) used if necessary to prepare the polyorganosiloxane rubber, compounds which can form a unit represented by either one of the formulae (I-1), (I-2), (I-3) and (I-4) are used:

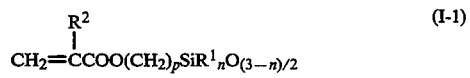

$$CH_2=CCOO(CH_2)_p SiR^1{}_n O_{(3-n)/2} \quad (I-1)$$
$$\overset{|}{R^2}$$

$$CH_2=CHSiR^1{}_nO_{(3-n)/2} \quad (I\text{-}2)$$

$$HS(CH_2)_pSiR^1{}_nO_{(3-n)/2} \quad (I\text{-}3)$$

or

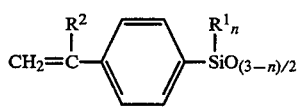
$$(I\text{-}4)$$

wherein $R^1$ represents a methyl, ethyl, propyl or phenyl group, $R^2$ represents a hydrogen atom or a methyl group, n represents an integer of 0, 1 or 2, and p represents an integer of 1 to 6.

(Meth)acryloyloxyalkylsiloxane which can form the unit represented by the formula (I-1), because of its high grafting efficiency, can form graft chains effectively, so that it is advantageous in terms of development of impact resistance. Among (meth)acryloyloxyalkylsiloxanes, methacryloyloxyalkylsiloxane is preferred. Specific examples of methacryloyloxyalkylsiloxane include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, δ-methacryloyloxybutyldiethoxymethylsilane and the like. Vinylsiloxane which can form the unit represented by the formula (I-2) includes vinylmethyldimethoxysilane, vinyltrimethoxysilane and the like. Mercaptosiloxane which can form the unit represented by the formula (I-3) includes γ-mercaptopropyldimethoxymethylsilane, γ-mercaptopropyltrimethoxysilane, γ-mercaptopropyldiethoxyethylsilane and the like. Compounds which can form the unit represented by the formula (I-4) include p-vinylphenylmethyldimethoxysilane and the like.

The amount of the component derived from the cyclic organosiloxane is 60 wt. % or more, preferably 70 wt. % or more of the polyorganosiloxane rubber. The amount of the component derived from the crosslinking agent (I) is 0.1 to 30 wt. % thereof, and that of the component derived from the graft-linking agent (I) is 0 to 10 wt. %, preferably 0.1 to 10 wt. % thereof.

For producing the latex of this polyorganosiloxane rubber component, methods described, for example, in U.S. Pat. Nos. 2,891,920, 3,294,725, etc. can be used. In practicing the present invention, it is preferred to produce the latex by the method in which a mixed solution of organosiloxane, the crosslinking agent (I) and if necessary the graft-linking agent (I) is shear-mixed with water with, for example, a homogenizer in the presence of a sulfonic acid emulsifier such as an alkylbenzenesulfonic acid, an alkylsulfonic acid and the like. As the sulfonic acid emulsifier, an alkylbenzenesulfonic acid is preferably used because it acts as an emulsifier for organosiloxane and at the same time acts as a polymerization initiator. In this case, it is preferred to use the metal salt of the alkylbenzenesulfonic acid or an alkylsulfonic acid together with the above sulfonic acid because the metal salt has an effect to keep the emulsified state of the polymer stable during the graft polymerization.

The compound rubber used in the present invention is one which has such a structure that 1 to 99 wt. % of the polyorganosiloxane rubber component and 99 to 1 wt. % of the polyalkyl (meth)acrylate rubber component have been inseparably united with each other, and in which the total amount of both the components is 100 wt. %.

When the composite rubber in which the amount of the polyorganosiloxane rubber component exceeds 99 wt. % is used, the graft copolymer obtained gives molded products having a reduced bond strength to paint film applied thereon. When the composite rubber in which the amount of the polyalkyl (meth)acrylate rubber component exceeds 99 wt. % is used, the graft copolymer obtained is low in impact resistance. Because of this, the composite rubber used in the present invention needs to be one in which the amount of any one of both the rubber components constituting it is in a range of 1 to 99 wt. %, provided that the total amount of both the components is 100 wt. %. Preferably, the amount of the polyorganosiloxane rubber component is 5 to 80 wt. %, and that of the polyalkyl (meth)acrylate rubber component is 95 to 20 wt. %.

For producing the composite rubber, it is desirable to use the emulsion polymerization method. That is, it is desirable to firstly prepare the polyorganosiloxane rubber by the emulsion polymerization method, and then to subject the monomer for synthesizing the polyalkyl (meth)acrylate rubber to emulsion polymerization in the presence of the polyorganosiloxane rubber latex prepared above.

The polyalkyl (meth)acrylate rubber component constituting the composite rubber can be synthesized using an alkyl (meth)acrylate, a crosslinking agent for the polyalkyl (meth)acrylate rubber component (hereinafter referred to as crosslinking agent (II)) and a graft-linking agent for the same (hereinafter referred to as graft-linking agent (II)).

The alkyl (meth)acrylate includes alkyl acrylates (e.g. methyl acrylate, ethyl acrylate, n-propyl acrylate, n-butyl acrylate, 2-ethylhexyl acrylate) and alkyl methacrylates (e.g. hexyl methacrylate, 2-ethylhexyl methacrylate, n-lauryl methacrylate). Among these, n-butyl acrylate is preferably used.

As the crosslinking agent (II), polyfunctional (meth)acrylates can be used. Specific examples thereof include ethylene glycol dimethacrylate, propylene glycol dimethacrylate, 1,3-butylene glycol dimethacrylate, 1,4-butylene glycol dimethacrylate, allyl methacrylate and the like.

As the graft-linking agent (II), compounds having two kinds of unsaturated group different in reactivity therebetween are used. Examples of such the compound include allyl methacrylate, triallyl cyanulate, triallyl isocyanulate and the like. The three allyl groups of both triallyl cyanulate and triallyl isocyanulate seem to have reactivity of the same level, but after a first allyl group has reacted, second and third allyl groups react in different reactivity from that of the first one. Triallyl cyanulate and triallyl isocyanulate, therefore, can be considered to have unsaturated groups different in reactivity. In the case of allyl methacrylate having two unsaturated groups, one of the groups having lower reactivity also reacts in part during polymerization to work as crosslinking site, but does not react in full, so that the remaining unsaturated group works as grafting site during the subsequent graft polymerization.

These crosslinking agents (II) and graft-linking agents (II) can be used alone or in combination of two or more of them. Hereupon, it is desirable to cause allyl methacrylate to own the functions of the both, i.e. to use allyl methacrylate both as a crosslinking agent for the polyalkyl (meth)acrylate rubber and as a graft-linking agent for the same.

The amount of any one of these crosslinking agent (II) and graft-linking agent (II) used is 0.1 to 10 wt. % of the polyalkyl (meth)acrylate rubber component. When allyl methacrylate is used as both the crosslinking agent (II) and the graft-linking agent (II), an effect that there is no need to further use other crosslinking agent (II) and graft-linking agent (II) is obtained by using the allyl methacrylate in amounts of 0.2 to 20 wt. % of the polyalkyl (meth)acrylate rubber component.

The polyalkyl (meth)acrylate rubber component can be formed by adding the above alkyl (meth)acrylate, crosslinking agent (II) and graft-linking agent (II) to the polyorganosiloxane rubber latex and subjecting the mixture to polymerization. These alkyl (meth)acrylate and both agents (II) may be added either in one portion or dropwise to the polymerization system.

With the progress of the polymerization, the polyalkyl (meth)acrylate rubber component formed by the polymerization and the polyorganosiloxane rubber component are entangled and united with each other at the interface of the both to form a crosslinked network. Particularly, when the graft-linking agent (I) has been used in producing the polyorganosiloxane rubber component, grafting of the polyalkyl (meth)acrylate rubber component onto the polyorganosiloxane rubber component also takes place. In either case, a compound rubber latex which cannot substantially be separated into both the rubber components is obtained.

This compound rubber has a structure that the polyorganosiloxane rubber component and polyalkyl (meth)acrylate rubber component have been entangled in part, united with each other and crosslinked in that state, so that it cannot be separated into both the rubber components by extraction with usual organic solvents such as acetone, toluene, etc.

A preferred compound rubber used in the present invention is one in which the component derived from the cyclic organosiloxane in the polyorganosiloxane rubber component has a repeating unit of dimethylsiloxane, and the component derived from an alkyl (meth)acrylate in the polyalkyl (meth)acrylate rubber component has a repeating unit of n-butyl acrylate.

The compound rubber thus obtained is graft-copolymerizable with a monomer having an ethylenically unsaturated bond, particularly a vinyl monomer.

The polyorganosiloxane graft copolymer of the present invention is obtained by graft-polymerizing one or more kinds of monomer which have an ethylenically unsaturated bond and contain an epoxy group-containing vinyl monomer onto this composite rubber. If the graft copolymer is constituted so that the component derived from the epoxy group-containing vinyl monomer is contained in amounts of 1 to 30 wt. %, preferably 2 to 30 wt. % of the graft copolymer, other monomer having an ethylenically unsaturated bond than the epoxy group-containing vinyl monomer may be graft-polymerized together.

The epoxy group-containing vinyl monomer includes glycidyl methacrylate, glycidyl acrylate, vinyl glycidyl ether, allyl glycidyl ether, glycidyl ether of hydroxyalkyl (meth)acrylate, glycidyl ether of polyalkylene glycol (meth)acrylate, glycidyl itaconate and the like. Among these, glycidyl methacrylate is preferably used.

The monomer having an ethylenically unsaturated bond copolymerizable with the epoxy group-containing vinyl monomer includes aromatic alkenyl compounds (e.g. styrene, halogen-substituted styrene, α-methylstyrene, vinyltoluene, vinylpyridine), methacrylates (e.g. methyl methacrylate, 2-ethylhexyl methacrylate), acrylates (e.g. methyl acrylate, ethyl acrylate, butyl acrylate) and vinyl cyanide compounds (e.g. acrylonitrile, methacrylonitrile). These monomers are used alone or in combination of two or more of them.

The proportion of the component derived from the grafted monomer having an ethylenically unsaturated bond, particularly grafted vinyl monomer in the graft copolymer is preferably 5 to 95 wt. %, more preferably 10 to 90 wt. %, most preferably 10 to 50 wt. % when the weight of the graft copolymer is taken as 100%.

Also, it is desirable for the polyorganosiloxane graft copolymer of the present invention to have an average particle size ranging from 0.08 to 0.6 μm. When the average particle size is less than 0.08 μm, it becomes difficult to obtain sufficient impact strength, and when it is larger than 0.6 μm, there is a fear that the graft copolymer obtained gives molded products having a poor surface appearance.

The polyorganosiloxane graft copolymer having such the average particle size can be obtained by one-stage or multi-stage emulsion graft-polymerization of one or more kinds of monomer containing the epoxy group-containing vinyl monomer in the presence of the above compound rubber latex. When the multi-stage graft-copolymerization is carried out using the epoxy group-containing vinyl monomer and other monomer than the one above as the aforementioned one or more kinds of monomer containing the epoxy group-containing vinyl monomer, it is desirable to add the epoxy group-containing vinyl monomer at the last stage of the graft polymerization.

In this graft polymerization, the component alone corresponding to the branch of the graft copolymer, which refers herein to a component derived from one or more kinds of monomer which have an ethylenically unsaturated bond and contain the epoxy group-containing vinyl monomer, polymerizes by itself without grafting onto a trunk component which refers herein to the composite rubber, to produce the so-called free polymer as by-product. In other words, a mixture of the desired graft copolymer and the free polymer is obtained by the graft polymerization. In the present invention, however, this mixture is referred to as "graft copolymer".

The polyorganosiloxane graft copolymer of the present invention is excellent in impact resistance, low-temperature characteristics and weather resistance, and when molded and painted, gives molded products excellent in adhesion to paint film. Further, it is also useful as adhesives, being able to be used for adhesion of metals (e.g. aluminum), wood, paper, glass, etc. and adhesion of various structural laminates. Particularly, it is useful as reactive hot melt adhesives for adhesion of aromatic polymer molded products.

The above aromatic polymer includes aromatic polyesters such as polyethylene terephthalate, polybutylene terephthalate, polyethylene terephthalate.isophthalate, polyethylene-2,6-naphthalenedicarboxylate, polyphenylene terephthalate, bisphenol A/terephthalic acid polycondensate, bisphenol A/terephthalic acid/ isophthalic acid copolycondensate, etc., substituted or unsubstituted polyphenylene oxide and substituted or unsubstituted polyphenylene sulfide. Among these, polyethylene terephthalate, polybutylene terephthalate, substituted or unsubstituted polyphenylene oxide and substituted or unsubstituted polyphenylene sulfide can be given as a preferred object to be adhered with the graft copolymer of the present invention.

The polyorganosiloxane graft copolymer of this invention can be made into a resin composition by mixing with various thermoplastic resins. Further, into the compound rubber graft copolymer of this invention, if necessary, dyes, pigments, stabilizers, reinforcing agents, fillers, flame retardants, etc. may be incorporated. The above various thermoplastic resins include polymers of one or more monomers selected from the group consisting of aromatic alkenyl compounds, methacrylates, acrylates and vinyl cyanides, polyphenylene ether resins, polystyrene resins, polyacetal resins, vinyl chloride resins, polyamide resins, polyphenylene sulfide resins, polymers and copolymers of ethylenic unsaturated monomers, polyester resins, polycarbonate resins, polyether imide resins, polymethacryl imide resins and the like.

The present invention will be illustrated in more detail with reference to the following examples and comparative examples, but it is not to be interpreted as being limited thereto.

In the examples and comparative examples, "part" and "percent (%)" mean "part by weight" and "wt %", respectively, unless otherwise stated. The physical properties in the above examples were measured by the following methods.

Adhesion property of paint film:

A flat plate was prepared by molding the polyorganosiloxane graft copolymer, and its surface was coated with a two-component acrylic urethane paint (reaction product of tolylenediisocyanate with acrylic polyol). After drying, 11 parallel grooves were cut into the coated surface at intervals of 1 mm in one direction, and the same procedure was repeated in the direction perpendicular thereto, thereby forming 100 grid patterns of 1 mm$^2$. A cellophane adhesive tape was applied over the cross-hatched area and peeled off the area in the vertical direction to the surface of the flat plate, and the number of the paint films peeled off the area was counted. The adhesion property of the paint film was evaluated according to the following standard:

| | |
|---|---|
| ⊚ | 10 or less |
| ○ | 11 to 20 |
| △ | 21 to 40 |
| x | 41 or more |

Izod impact strength:

Measured according to ASTM D-256 using a test piece with a ¼" notch.

Heat distortion temperature:

Measured according to ASTM D-648 (low load, 4.6 kg/cm$^2$; high load, 18.6 kg/cm$^2$).

Weather resistance:

The test piece was exposed for 1000 hours in a sunshine weatherometer, and the change of the color was examined by visual assessment. The weather resistance was evaluated according to the following standard:

| | |
|---|---|
| ○ | No change |
| △ | Slight change to yellow |
| x | Change to yellow |

Average particle size:

Measured according to the quasi-elastic light scattering method (MALVERN SYSTEM 4600; measurement temperature, 25° C.; angle of scattering, 90 degrees) using an aqueous dilute solution of the latex as sample solution.

Wet heat property:

A test piece is subjected to a pressure cooker test at 120° C. and 100% RH for 100 hours and thereafter measured for Izod impact strength.

EXAMPLE 1

Two parts of tetraethoxysilane, 0.5 part of γ-methacryloyloxypropyldimethoxymethylsilane and 97.5 parts of octamethylcyclotetrasiloxane were mixed to obtain 100 parts of a siloxane mixture. One part of sodium dodecylbenzenesulfonate and 1 part of dodecylbenzenesulfonic acid were dissolved in 200 parts of distilled water, and to the resulting solution was added 100 parts of the above siloxane mixture. The resulting mixture was preliminarily stirred at 10000 rpm with a homomixer and then emulsified with a homogenizer under a pressure of 300 kg/cm$^2$ to obtain an organosiloxane latex. This latex was transferred to a separable flask equipped with a condenser and a stirring blade, and heated at 80° C. for 5 hours with stirring and mixing and then allowed to stand at 20° C. for 48 hours. Thereafter, this latex was neutralized to a pH of 7.0 with an aqueous sodium hydroxide solution to complete polymerization. Thus, a polyorganosiloxane latex (hereinafter referred to as POS-1) was obtained. The conversion of the siloxane mixture to the polyorganosiloxane rubber was 89.7%, and the average particle size of the polyorganosiloxane rubber was 0.16 μm.

One hundred and fifty parts of POS-1 was sampled and put in a separable flask equipped with a stirrer. After 185 parts of distilled water was added and the atmosphere of the flask was replaced by a nitrogen gas, the contents of the flask were heated to 50° C. At this temperature, a mixed solution of 45 parts of n-butyl acrylate, 0.9 part of allyl methacrylate and 0.108 part of tert-butyl hydroperoxide was added, after which stirring was continued for 30 minutes to allow these components to soak into the polyorganosiloxane rubber particles. Thereafter, a mixed solution of 0.001 part of ferrous sulfate, 0.003 part of disodium ethylenediaminetetraacetate, 0.108 part of Rongalite (sodium formaldehyde sulfoxylate) and 10 parts of distilled water was added to carry out radical polymerization. The reaction mixture was kept at an inner temperature of 70° C. for 2 hours to complete the polymerization. Thus, a compound rubber latex was obtained. The conversion of the butyl acrylate rubber component was 98.8%.

Forty parts of this compound rubber latex was sampled, and 260 parts of distilled water and 0.5 part of sodium dodecylbenzenesulfonate were added thereto. Subsequently, a mixed solution of 10 parts of glycidyl methacrylate, 24 parts of acrylonitrile, 56 parts of styrene and 0.216 part of tert-butyl hydroperoxide was added and the atmosphere of the flask was replaced by a nitrogen gas, then the contents of the flask were heated to 50° C. Thereafter, a mixed solution of 0.001 part of ferrous sulfate, 0.003 part of disodium ethylenediaminetetraacetate, 0.108 part of Rongalite and 10 parts of distilled water was further added to carry out radical polymerization. Thereafter, the reaction mixture was kept at an inner temperature of 70° C. for 4 hours to complete graft polymerization onto the compound rubber to obtain a graft copolymer latex. The conversion of glycidyl methacrylate, acrylonitrile and styrene was 97.5%, and the average particle size of the graft copolymer latex was 0.20 μm. The resulting graft copolymer latex was coagulated with an aqueous calcium chloride solution, and the resulting coagulated product was filtered off and dried to obtain the dry powder of a polyorganosiloxane graft copolymer (hereinafter referred to as S-1).

S-1 was pelletized by extruding it through an extruder at a barrel temperature of 230° C. and molded into a flat plate of 100 mm×100 mm×3 mm with an injection molding machine ("IS-100" produced by Toshiba Machine Co., Ltd.) at a cylinder temperature of 230° C. and a mold temperature of 60° C. The surface of this flat plate was degreased with methanol and painted with an acrylicurethane paint. The peeling test of this paint film was carried out. Under the same injection molding conditions as above, a test piece for evaluation of impact strength was prepared, and the impact strength was evaluated. In the same manner, the impact strength was again evaluated after the pressure cooker test. The results are shown in Table 1.

EXAMPLE 2

A polyorganosiloxane graft copolymer of 0.20 μm in average particle size (hereinafter referred to as S-2) was obtained in the same manner as in Example 1 except that as a monomer mixture to be graft-polymerized onto the compound rubber latex, a mixture of 10 parts of glycidyl methacrylate and 80 parts of styrene was used in place of the mixture of 10 parts of glycidyl methacrylate, 24 parts of acrylonitrile and 56 parts of styrene. The resulting graft copolymer was evaluated in the same manner as in Example 1. The results are shown in Table 1.

Comparative Example 1

Thirty-three parts of POS-1 obtained according to Example 1 was sampled, and 267 parts of distilled water and 0.5 part of sodium dodecylbenzenesulfonate were added thereto. Subsequently, a mixed solution of 10 parts of glycidyl methacrylate, 24 parts of acrylonitrile, 56 parts of styrene and 0.216 part of tertbutyl hydroperoxide was added and the atmosphere of the flask was replaced by a nitrogen gas. Then, the contents of the flask were heated to 50° C. Thereafter, a mixed solution of 0.001 part of ferrous sulfate, 0.003 part of disodium ethylenediaminetetraacetate, 0.108 part of Rongalite and 10 parts of distilled water was further added to carry out radical polymerization. Thereafter, the reaction mixture was kept at an inner temperature of 70° C. for 4 hours to complete graft polymerization onto the polyorganosiloxane rubber to obtain a graft copolymer latex. The conversion of glycidyl methacrylate, acrylonitrile and styrene was 96.3%, and the average particle size of the graft copolymer latex was 0.21 μm. The resulting graft copolymer latex was coagulated with an aqueous calcium chloride solution, and the coagulated product was filtered off and dried to obtain the dry powder of a polyorganosiloxane graft copolymer (hereinafter referred to as S-3).

S-3 was evaluated in the same manner as in Example 1. The results are shown in Table 1.

EXAMPLE 3

A polyorganosiloxane graft copolymer of 0.20 μm in average particle size (hereinafter referred to as S-4) was obtained in the same manner as in Example 1 except that as a monomer mixture to be graft-polymerized onto the compound rubber, a mixture of 20 parts of glycidyl methacrylate, 21 parts of acrylonitrile and 49 parts of styrene was used in place of the mixture of 10 parts of glycidyl methacrylate, 24 parts of acrylonitrile and 56 parts of styrene. The resulting graft copolymer was evaluated in the same manner as in Example 1. The results are shown in Table 1.

EXAMPLE 4

A polyorganosiloxane graft copolymer (hereinafter referred to as S-5) was obtained in the same manner as in Example 1 except that the amount of the compound rubber latex sampled for graft copolymerization onto the compound rubber was 80 parts, the amount of distilled water to be added thereto was 230 parts, and that a mixture of 10 parts of glycidyl methacrylate, 21 parts of acrylonitrile and 49 parts of styrene was used as a monomer mixture to be graft-polymerized. The resulting graft copolymer was evaluated in the same manner as in Example 1. The results are shown in Table 1. The conversion of glycidyl methacrylate, acrylonitrile and styrene was 98.1%, and the average particle size of the graft copolymer latex was 0.21 μm.

EXAMPLE 5

A polyorganosiloxane graft copolymer (hereinafter referred to as S-6) was obtained in the same manner as in Example 1 except that the amount of the compound rubber latex sampled for graft copolymerization onto the compound rubber was 120 parts, the amount of distilled water to be added thereto was 200 parts, and that a mixture of 10 parts of glycidyl methacrylate, 18 parts of acrylonitrile and 42 parts of styrene was used as a monomer mixture to be graft-polymerized. The resulting graft copolymer was evaluated in the same manner as in Example 1. The results are shown in Table 1. The conversion of glycidyl methacrylate, acrylonitrile and styrene was 98.1%, and the average particle size of the graft copolymer latex was 0.20 μm.

Comparative Example 2

Ninety-nine parts of POS-1 obtained in the same manner as in Example 1 was sampled, and 218 parts of distilled water and 0.5 part of sodium dodecylbenzenesulfonate were added thereto. Subsequently, a mixed solution of 10 parts of glycidyl methacrylate, 18 parts of acrylonitrile, 42 parts of styrene and 0.216 part of tertbutyl hydroperoxide was added to allow these components to soak into the polyorganosiloxane rubber particles. Thereafter, the atmosphere of the flask was replaced by a nitrogen gas, and the contents of the flask were heated to 50° C. Subsequently, a mixed solution of 0.001 part of ferrous sulfate, 0.003 part of disodium ethylenediaminetetraacetate, 0.108 part of Rongalite and 10 parts of distilled water was further added to carry out graft polymerization onto the polyorganosiloxane rubber. Thereafter, the reaction mixture was kept at an inner temperature of 70° C. for 4 hours to complete the graft polymerization. Thus, the latex of a polyorganosiloxane graft copolymer was obtained. The resulting graft copolymer latex was coagulated with an aqueous calcium chloride solution, and the coagulated product was filtered off and dried to obtain the dry powder of a polyorganosiloxane graft copolymer (hereinafter referred to as S-7). S-7 was evaluated in the same manner as in Example 1. The results are shown in Table 1. The conversion of glycidyl methacrylate, acrylonitrile and styrene was 96.3%, and the average particle size of the graft copolymer latex was 0.20 μm.

EXAMPLE 6

A polyorganosiloxane graft copolymer (hereinafter referred to as S-8) was obtained in the same manner as in Example 1 except that the amount of the compound rubber latex sampled for graft copolymerization onto the compound rubber was 160 parts, the amount of distilled water to be added thereto was 170 parts, and that a mixture of 10 parts of glycidyl methacrylate, 15 parts of acrylonitrile and 35 parts of styrene was used as a monomer mixture to be graft-polymerized. The resulting graft copolymer was evaluated in the same manner as in Example 1. The results are shown in Table 1. The conversion of glycidyl methacrylate, acrylonitrile and styrene was 98.1%, and the average particle size of the graft copolymer latex was 0.20 μm.

EXAMPLE 7

A polyorganosiloxane graft copolymer (hereinafter referred to as S-9) was obtained in the same manner as in Example 1 except that the amount of the compound rubber latex sampled for graft copolymerization onto the compound rubber was 200 parts, the amount of distilled water to be added thereto was 140 parts, and that a mixture of 10 parts of glycidyl methacrylate, 12 parts of acrylonitrile and 28 parts of styrene was used as a monomer mixture to be graft-polymerized. The resulting graft copolymer was evaluated in the same manner as in Example 1. The results are shown in Table 1. The conversion of glycidyl methacrylate, acrylonitrile and styrene was 97.8%, and the average particle size of the graft copolymer latex was 0.18 μm.

EXAMPLE 8

A polyorganosiloxane graft copolymer (hereinafter referred to as S-10) was obtained in the same manner as in Example 1 except that the amount of the compound rubber latex sampled for graft copolymerization onto the compound rubber was 240 parts, the amount of distilled water to be added thereto was 110 parts, and that a mixture of 10 parts of glycidyl methacrylate, 9 parts of acrylonitrile and 21 parts of styrene was used as a monomer mixture to be graft-polymerized. The resulting graft copolymer was evaluated in the same manner as in Example 1. The results are shown in Table 1. The conversion of glycidyl methacrylate, acrylonitrile and styrene was 98.2%, and the average particle size of the graft copolymer latex was 0.18 μm.

Comparative Example 3

Two hundreds parts of POS-1 obtained in the same manner as in Example 1 was sampled, and 150 parts of distilled water and 0.5 part of sodium dodecylbenzenesulfonate were added thereto. Subsequently, a mixed solution of 10 parts of glycidyl methacrylate, 9 parts of acrylonitrile, 21 parts of styrene and 0.15 part of tert-butyl hydroperoxide was added to allow these components to soak into the polyorganosiloxane rubber particles. After the atmosphere of the reactor was replaced by a nitrogen gas, the reaction mixture was heated to 50° C., and at this temperature, a mixed solution of 0.001 part of ferrous sulfate, 0.003 part of disodium ethylenediaminetetraacetate, 0.1 part of Rongalite and 10 parts of distilled water was added to carry out graft polymerization onto the polyorganosiloxane rubber. Thereafter, the reaction mixture was kept at an inner temperature of 70° C. for 4 hours to complete the graft polymerization. Thus, the latex of a polyorganosiloxane graft copolymer was obtained. The resulting graft copolymer latex was coagulated with an aqueous calcium chloride solution, and the coagulated product was filtered off and dried to obtain the dry powder of a polyorganosiloxane graft copolymer (hereinafter referred to as S-11). S-11 was evaluated in the same manner as in Example 1. The results are shown in Table 1. The conversion of glycidyl methacrylate, acrylonitrile and styrene was 96.5%, and the average particle size of the graft copolymer latex was 0.21 μm.

Comparative Example 4

A polyorganosiloxane graft copolymer (hereinafter referred to as S-12) was obtained in the same manner as in Example 1 except that as a monomer mixture to be graft-polymerized onto the compound rubber latex, a mixture of 27 parts of acrylonitrile and 63 parts of styrene was used in place of the mixture of 10 parts of glycidyl methacrylate, 24 parts of acrylonitrile and 56 parts of styrene. The resulting graft copolymer was evaluated in the same manner as in Example 1. The results are shown in Table 1.

TABLE 1

| | Rubber composition (part) (PDMS/PBA) | Composition of monomers to be grafted (parts) | | | Izod impact strength | | Weather resistance | Adhesion property of paint film | Izod impact strength evaluated at 23° C. after pressure cooker test for 100 hr |
|---|---|---|---|---|---|---|---|---|---|
| | | GMA | AN | St | 23° C. | 0° C. | | | |
| Example 1 (S-1) | 5/5 | 10 | 24 | 56 | 15 | 13 | ○ | ⊙ | 14 |
| Example 2 (S-2) | 5/5 | 10 | — | 80 | 14 | 13 | ○ | ⊙ | 14 |
| Comparative Example 1 (S-3) | 10/0 | 10 | 24 | 56 | 17 | 16 | ○ | ○ | 3 |
| Example 3 (S-4) | 5/5 | 20 | 21 | 49 | 15 | 14 | ○ | ⊙ | 15 |
| Example 4 (S-5) | 10/10 | 10 | 21 | 49 | 38 | 33 | ○ | ⊙ | 35 |
| Example 5 (S-6) | 15/15 | 10 | 18 | 42 | 49 | 42 | ○ | ⊙ | 45 |
| Comparative Example 2 (S-7) | 30/0 | 10 | 18 | 42 | 51 | 50 | ○ | ○ | 7 |
| Example 6 (S-8) | 20/20 | 10 | 15 | 35 | 53 | 49 | ○ | ⊙ | 49 |
| Example 7 | 25/25 | 10 | 12 | 28 | 65 | 58 | ○ | ⊙ | 63 |

TABLE 1-continued

| | Rubber composition (part) (PDMS/PBA) | Composition of monomers to be grafted (parts) | | | Izod impact strength | | Weather resistance | Adhesion property of paint film | Izod impact strength evaluated at 23° C. after pressure cooker test for 100 hr |
|---|---|---|---|---|---|---|---|---|---|
| | | GMA | AN | St | 23° C. | 0° C. | | | |
| (S-9) Example 8 (S-10) | 30/30 | 10 | 9 | 21 | N.B.[2] | N.B. | ○ | ○ | 82 |
| Comparative Example 3 (S-11) | 60/0 | 10 | 9 | 21 | N.B. | N.B. | ○ | x | 9 |
| Comparative Example 4 (S-12) | 5/5 | — | 27 | 63 | 14 | 12 | ○ | x | 3 |

(1) In the above table:
PDMS: Polydimethylsiloxane
PBA: Polybutyl acrylate
GMA: Glycidyl methacrylate
AN: Acrylonitrile
St: Styrene
(2) N.B. means that the test piece was not broken.

EXAMPLE 9

Two hundred and ninety parts of the composite rubber latex obtained according to Example 1 was sampled and put in a separable flask equipped with a stirrer. The atmosphere of the flask was replaced by a nitrogen gas. Then, the contents of the flask were heated to 50° C. Thereafter, a mixed solution of 0.00025 part of ferrous sulfate, 0.00075 part of disodium ethylenediaminetetraacetate, 0.025 part of Rongalit and 10 parts of distilled water was added. A mixed solution of 10 parts of glycidyl methacrylate and 0.024 part of tertbutyl hydroperoxide was dropwise-added thereto over 30 minutes. The reaction mixture was kept at an inner temperature of 70° C. for 4 hours to carry out graft polymerization onto the compound rubber. Thus, the latex of a polyorganosiloxane graft copolymer (hereinafter referred to as S-13) was obtained. This graft copolymer latex was coagulated with an aqueous calcium chloride solution, and the coagulated product was filtered off and dried to obtain the dry powder of S-13. The conversion of glycidyl methacrylate was 98.5%, and the average particle size of the graft copolymer latex was 0.20 μm.

One piece of the S-13 film was put between two pieces of polyethylene terephthalate film of 100 μm in thickness (trade name, LUMIRROR; produced by Toray Industries, Inc.) and heat-pressed at 200° C. for 10 minutes under a pressure of 10 kg/cm² to prepare a three-layer sheet of which the middle layer was 20 μm in thickness. A test piece of 10 mm in width was cut out of this sheet, and a 180-degree peeling test was carried out at 23° C. and 0° C. to measure the interlaminar bond strength. The results are shown in Table 2.

EXAMPLE 10

A composite rubber latex was obtained in the same manner as in Example 1 except that 210 parts of POS-1 obtained according to Example 1 was sampled, 143 parts of distilled water was added thereto, the amounts of n-butyl acrylate, allyl methacrylate and tert-butyl hydroperoxide added were 27 parts, 0.454 part and 0.065 part, respectively, and that the amounts of ferrous sulfate, disodium ethylenediaminetetraacetate and Rongalite were 0.00037 part, 0.00111 part and 0.089 part, respectively. To this rubber latex was dropwise added a mixed solution of 10 parts of glycidyl methacrylate and 0.024 part of tert-butyl hydroperoxide over 30 minutes. The reaction mixture was kept at an inner temperature of 70° C. for 4 hours to complete graft polymerization onto the compound rubber. The conversion of glycidyl methacrylate was 98.1%, and the average particle size of the graft copolymer latex was 0.20 μm. The resulting graft copolymer latex was coagulated with an aqueous calcium chloride solution, and the coagulated product was filtered off and dried to obtain the dry powder of a polyorganosiloxane graft copolymer (hereinafter referred to as S-14).

S-14 was evaluated in the same manner as in Example 9. The results are shown in Table 2.

EXAMPLE 11

The dry powder of a polyorganosiloxane graft copolymer (hereinafter referred to as S-15) was obtained in the same manner as in Example 10 except that the amount of POS-1 sampled was 90 parts, the amount of distilled water added was 227 parts, the amounts of n-butyl acrylate, allyl methacrylate and tert-butyl hydroperoxide added were 63 parts, 1.26 part and 0.151 part, respectively, and that the amounts of ferrous sulfate, disodium ethylenediaminetetraacetate and Rongalite were 0.00073 part, 0.0022 part and 0.18 part, respectively. S-15 was evaluated in the same manner as in Example 9. The results are shown in Table 2. The conversion of glycidyl methacrylate was 97.2%, and average particle size of the graft copolymer latex was 0.21 μm.

EXAMPLE 12

Graft polymerization onto the compound rubber was carried out in the same manner as in Example 9 except that the amount of the compound rubber latex sampled was 360 parts, and a mixture of 5 parts of glycidyl methacrylate and 5 parts of butyl acrylate was used in place of 10 parts of glycidyl methacrylate. Thus, the latex of a polyorganosiloxane graft copolymer (hereinafter referred to as S-16) was obtained. This latex was coagulated with an aqueous calcium chloride solution, and the coagulated product was filtered off and dried to obtain the dry powder of S-16. The conversion of glycidyl methacrylate and butyl acrylate was 97.3%, and the average particle size of the graft copolymer latex was 0.20 μm. S-16 was evaluated in the same manner as in Example 9. The results are shown in Table 2.

EXAMPLE 13

The latex of a graft copolymer (hereinafter referred to as S-17) was obtained in the same manner as in Example 12 except that 5 parts of methyl methacrylate was used in place of 5 parts of butyl acrylate. This latex was coagulated, filtered off and dried to obtain the dry powder of S-17. S-17 was evaluated in the same manner as in Example 9. The results are shown in Table 2. The conversion of glycidyl methacrylate and methyl methacrylate was 97.8%, and the average particle size of the graft copolymer latex was 0.21 μm.

EXAMPLE 14

Graft polymerization onto the compound rubber was carried out in the same manner as in Example 9 except that the amount of the composite rubber latex sampled was 240 parts, a mixture of 20 parts of glycidyl methacrylate, 10 parts of butyl acrylate and 10 parts of methyl methacrylate was used in place of 10 parts of glycidyl methacrylate, and that the amount of tert-butyl hydroperoxide added was 0.096 part. Thus, the latex of a polyorganosiloxane graft copolymer (hereinafter referred to as S-18) was obtained. This latex was coagulated with an aqueous calcium chloride solution, and the coagulated product was filtered off and dried to obtain the dry powder of S-18. The conversion of glycidyl methacrylate, butyl acrylate and methyl methacrylate was 98.8%, and the average particle size of the graft copolymer latex was 0.21 μm. S-18 was evaluated in the same manner as in Example 9. The results are shown in Table 2.

EXAMPLE 15

The polyorganosiloxane graft copolymer (S-6) obtained in Example 5 was evaluated in the same manner as in Example 9. The results are shown in Table 2.

EXAMPLE 16

The polyorganosiloxane graft copolymer (S-8) obtained in Example 6 was evaluated in the same manner as in Example 9. The results are shown in Table 2.

Comparative Example 5

Two hundred and ninety parts of the compound rubber latex obtained in the same manner as in Example 1 was sampled, and a mixed solution of 10 parts of methyl methacrylate and 0.024 part of tert-butyl hydroperoxide was added thereto. The resulting mixture was kept at an inner temperature of 70° C. for 4 hours to carry out graft polymerization onto the composite rubber. The conversion of methyl methacrylate was 98.8%, and the average particle size of the graft copolymer latex was 0.20 μm. The resulting latex was coagulated with an aqueous calcium chloride solution, and the coagulated product was filtered off and dried to obtain the dry powder of a polyorganosiloxane graft copolymer (hereinafter referred to as S-19). This dry powder of S-19 was evaluated in the same manner as in Example 9. The results are shown in Table 2.

Comparative Example 6

A three-layer laminated sheet was prepared in the same manner as in Example 9 using an ethylene/glycidyl methacrylate copolymer (trade name, Bondfast E; produced by Sumitomo Chemical Co., Ltd.). The sheet was then evaluated in the same manner as in Example 9. The results are shown in Table 2.

EXAMPLE 17

The latex of a graft copolymer (hereinafter referred to as S-20) was obtained in the same manner as in Example 13 except that 5 parts of glycidyl acrylate was used in place of 5 parts of glycidyl methacrylate. The conversion of glycidyl acrylate and ethyl methacrylate was 97.2%, and the average particle size of the graft copolymer latex was 0.21 μm. This latex was coagulated, filtered off and dried to obtain the dry powder of S-20. S-20 was evaluated in the same manner as in Example 9. The results are shown in Table 2.

EXAMPLE 18

The latex of a graft copolymer (hereinafter referred to as S-21) was obtained in the same manner as in Example 13 except that 5 parts of diglycidyl itaconate was used in place of 5 parts of glycidyl methacrylate. The conversion of diglycidyl itaconate and methyl methacrylate was 98.0%, and the average particle size of the graft copolymer latex was 0.20 μm. This latex wax coagulated, filtered off and dried to obtain the dry powder of S-21. S-21 was evaluated in the same manner as in Example 9. The results are shown in Table 2.

TABLE 2

| | Kind of adhesive | Bond strength at 23° C. (g/cm) | Bond strength at 0° C. (g/cm) |
|---|---|---|---|
| Example 9 | S-13 | 890 | 840 |
| Example 10 | S-14 | 900 | 880 |
| Example 11 | S-15 | 850 | 800 |
| Example 12 | S-16 | 810 | 790 |
| Example 13 | S-17 | 820 | 780 |
| Example 14 | S-18 | 980 | 950 |
| Example 15 | S-6 | 1320 | 1230 |
| Example 16 | S-8 | 1160 | 1090 |
| Comparative Example 5 | S-19 | 50 | 40 |
| Comparative Example 6 | BF-E[1)] | 960 | 320 |
| Example 17 | S-20 | 810 | 790 |
| Example 18 | S-21 | 960 | 910 |

[1)]Bondfast E

Referential Example 1

Production of polyorganosiloxane graft copolymer (S-22)

Two parts of tetraethoxysilane, 0.5 part of γ-methacryloyloxypropyldimethoxymethylsilane and 97.5 parts of octamethylcyclotetrasiloxane were mixed to obtain 100 parts of a siloxane mixture. In 200 parts of distilled water were dissolved 0.67 part of sodium dodecylbenzenesulfonate and 0.67 part of dodecylbenzenesulfonic acid, and to the resulting solution was added 100 parts of the above siloxane mixture. The resulting mixture was preliminarily stirred at 10,000 rpm with a homomixer and then emulsified with a homogenizer under a pressure of 200 kg/cm$^2$ to obtain an organosiloxane latex. The latex was transferred to a separable flask equipped with a condenser and a stirring blade, and heated at 80° C. for 5 hours with stirring and mixing and then allowed to stand at 20° C. for 48 hours. Thereafter, this latex was neutralized to a pH of 7.0 with an aqueous sodium hydroxide solution to obtain a polyorganosiloxane rubber latex (hereinafter referred to as PDMS-1). The conversion of the siloxane mixture to the polyorganosiloxane rubber was 89.1%, and the number average particle size of the polyorganosiloxane rubber was 0.19 μm.

Thirty-five parts of this PDMS-1 was sampled and put in a separable flask equipped with a stirrer. After 175 parts of distilled water was added and the atmosphere of the flask was replaced by nitrogen, the contents of the flask were heated to 50° C. At this temperature, a mixed solution of 78.4 parts of n-butyl acrylate, 1.6 parts of allyl methacrylate and 0.3 part of tert-butyl hydroperoxide was added, after which stirring was continued for 30 minutes to allow this mixed solution to soak into the polyorganosiloxane rubber particles. Thereafter, a mixed solution of 0.002 part of ferrous sulfate, 0.006 part of disodium ethylenediaminetetraacetate, 0.3 part of Rongalite and 10 parts of distilled water was added to start radical polymerization. The reaction mixture was kept at an inner temperature of 70° C. for 2 hours to obtain a compound rubber latex. A part of this latex was sampled and dried to obtain a solid matter. This solid matter was extracted with toluene at 90° C. for 4 hours, and the gel content was measured to find that it was 95 wt %.

To this compound rubber latex was dropwise added a mixed solution of 10 parts of glycidyl methacrylate and 0.024 part of tert-butyl hydroperoxide over 15 minutes. Thereafter, the reaction mixture was kept at an inner temperature of 60° C. for 2 hours to carry out graft polymerization onto the compound rubber. The conversion of glycidyl methacrylate was 98.5%. The average particle size of the graft copolymer latex obtained was 0.24 μm. This latex was added to an aqueous solution containing 5 wt. % of calcium chloride at 40° C. so that the ratio of the latex and aqueous solution was 1:2. Thereafter, the mixed solution was heated to 90° C. to coagulate the latex. The coagulated product was washed repeatedly with water, and then the solid matter was separated and dried at 80° C. for 24 hours to obtain the dry powder of a polyorganosiloxane graft copolymer (S-22).

EXAMPLES 19 TO 21

Using as the polyamide resin nylon 6 (UBE 6 Nylon 1013NW8 produced by Ube Industries, Ltd.), nylon 66 (UBE 66 Nylon 2020B produced by Ube Industries, Ltd.) and nylon 46 (UNITIKA Nylon 46 F5000 produced by Unitika Ltd.), these resins and the graft copolymers S-22 obtained in Referential Example 1 were blended in proportions shown in Table 3, and melt-kneaded and pelletized with a twin-screw extruder (TEM-35B produced by Toshiba Machine Co., Ltd.) at a cylinder temperature of 260° to 290° C. The pellet obtained was dried and then molded into test pieces with an injection molding machine (Promat injection molding machine produced by Sumitomo Heavy Industries, Ltd.) at a cylinder temperature of 260° to 290° C. and at a mold temperature of 70° C. The impact resistance was then evaluated with the test pieces. The results are shown in Table 3.

TABLE 3

| | Resin composition (part) | | Filler | Izod impact strength (kg.cm/cm) | | HDT | Appear- | Adhesion property of |
|---|---|---|---|---|---|---|---|---|
| | Polyamide | Copolymer | (part) | 23° C. | −10° C. | (°C.) | ance | paint film |
| Example 19 | N66 80 | S-22 20 | | 106 | 99 | 222 (low) | ○ | ⊙ |
| Example 20 | N6 80 | S-22 20 | | 105 | 101 | 115 (low) | ○ | ⊙ |
| Example 21 | N46 80 | S-22 20 | | 106 | 102 | 272 (low) | ○ | ⊙ |
| Example 22 | N66 80 | S-22 20 | GF43 | 32 | 29 | 249 (high) | | |
| Example 23 | N66 80 | S-22 20 | TA43 | 18 | 14 | 235 (high) | | |
| Example 24 | N66 80 | S-22 20 | CF43 | 24 | 23 | 246 (high) | | |
| Example 25 | A-1 80 | S-22 20 | | 24 | | 140 (high) | ○ | ⊙ |
| Example 26 | A-2 80 | S-22 20 | | 19 | | 161 (high) | ○ | ⊙ |
| Example 27 | A-3 80 | S-22 20 | | 19 | | 143 (high) | ○ | ⊙ |
| Example 28 | PEI 80 | S-22 20 | | 112 | | 189 (high) | ○ | ⊙ |

Abbreviations in the table are as follows:
N66: Nylon 66
N6: Nylon 6
N46: Nylon 46
low: low load
high: high load
GF: Glass Fiber
CF: Carbon Fiber
TA: Talc
PEI: Polyetherimide

EXAMPLES 22 to 24

Test pieces were prepared by injection molding and evaluated in the same manner as in Example 19 except that a glass fiber (GF), carbon fiber (CF) and talc (TA) were used as a filter and blended in proportions shown in Table 3. The results are shown in Table 3.

Referential Example 2

Production of polymethacrylimide resin

One hundred parts of sufficiently dried polymethyl methacrylate, 100 parts of toluene, 10 parts of methanol and a primary amine or ammonia shown in Table 4, its amount being shown in Table 4, were fed to an autoclave and reacted at 230° C. for 2 hours with stirring. The reaction product thus obtained was extruded and pelletized through a vent-type extruder at a resin temperature of 260° C. while removing a volatile gas from the vent.

TABLE 4

| Kind of polymethacrylimide resin | Imidizing agent | | Imide ring content (%) | Heat distortion temperature (°C.) |
|---|---|---|---|---|
| | Kind | Amount (part) | | |
| A-1 | Methylamine | 20 | 85 | 142 |
| A-2 | Methylamine | 30 | 97 | 169 |
| A-3 | Ammonia | 20 | 75 | 156 |

EXAMPLES 25 to 27

The polymethacrylimide resins A-1 to A-3 obtained in Referential Example 2 and the graft copolymers S-22 obtained in Referential Example 1 were blended in proportions shown in Table 3, and melt-neaded and pelletized with a twin-screw extruder (TEM-35B produced by Toshiba Machine Co., Ltd.) at a cylinder temperature of 280° C. The pellet obtained was dried and then molded into test pieces with an injection molding machine (Promat injection molding machine produced by Sumitomo Heavy Industries, Ltd.) at a cylinder temperature of 280° C. and at a mold temperature of 60° C. The impact resistance was then evaluated with the test pieces. The results are shown in Table 3.

EXAMPLE 28

A polyetherimide resin (Ultem #1000 produced by General Electric Co., Ltd.) and the graft copolymers S-22 obtained in Referential Example 1 were blended in proportions shown in Table 3, and melt-kneaded and pelletized with a twin-screw extruder (TEM-35B produced by Toshiba Machine Co., Ltd.) at a cylinder temperature of 350° C. The pellet obtained was dried and then molded into test pieces with an injection molding machine (Promat injection molding machine produced by Sumitomo Heavy Industries, Ltd.) at a cylinder temperature of 350° C. and at a mold temperature of 80° C. The impact resistance was then evaluated with the test pieces. The results are shown in Table 3.

What is claimed is:

1. A polyorganosiloxane graft copolymer having wet heat strength which is obtained by graft-polymerizing one or more kinds of monomer which have ethylenically unsaturated bond and contain at least an epoxy group-containing vinyl monomer onto a compound rubber in which a polyorganosiloxane rubber and a polyalkyl (meth)acrylate rubber have been inseparably united with each other, and in which the component derived from the epoxy group-containing vinyl monomer is present in a proportion between about 1 wt. % and about 30 wt. % relative to the whole polyorganosiloxane graft copolymer.

2. A polyorganosiloxane graft copolymer according to claim 1, wherein the compound rubber is obtained by polymerizing an alkyl (meth)acrylate, a crosslinking agent for polyalkyl (meth)acrylate rubber and a graft-linking agent for polyalkyl (meth)acrylate rubber in the presence of a polyorganosiloxane rubber obtained by emulsion-polymerizing organosiloxane, a crosslinking agent for polyorganosiloxane rubber and if necessary a graft-linking agent for polyorganosiloxane rubber.

3. A polyorganosiloxane graft copolymer according to claim 1, wherein the polyorganosiloxane rubber comprises polydimethylsiloxane as a main component.

4. A polyorganosiloxane graft copolymer according to claim 1, wherein the polyalkyl (meth)acrylate rubber comprises poly-n-butyl acrylate as a main component.

5. A polyorganosiloxane graft copolymer according to claim 1, wherein the amounts of the polyorganosiloxane rubber component and the polyalkyl (meth)acrylate rubber component constituting the compound rubber are 5 to 80 wt. % and 95 to 20 wt %, respectively.

6. A polyorganosiloxane graft copolymer according to claim 2, wherein the crosslinking agent for the polyorganosiloxane rubber is a tetraalkoxysilane.

7. A polyorganosiloxane graft copolymer according to claim 2, wherein the graft-linking agent for the polyorganosiloxane rubber is methacryloyloxysiloxane.

8. A polyorganosiloxane graft copolymer according to claim 2, wherein both the crosslinking agent and graft-linking agent for the polyalkyl (meth)acrylate rubber are allyl methacrylate.

9. A polyorganosiloxane graft copolymer according to claim 1, wherein the proportion of the component derived from one or more kinds of monomer which have an ethylenically unsaturated bond and contain at least an epoxy group-containing vinyl monomer to be graft-polymerized onto the compound rubber is 10 to 90 wt. % based on the whole polyorganosiloxane graft copolymer.

10. A polyorganosiloxane graft copolymer according to claim 1, wherein the proportion of the component derived from one or more kinds of monomer which have an ethylenically unsaturated bond and contain at least an epoxy group-containing vinyl monomer to be graft-polymerized onto the compound rubber is 10 to 50 wt. % based on the whole polyorganosiloxane graft copolymer.

11. A polyorganosiloxane graft copolymer according to claim 1, wherein the proportion of the component derived from the epoxy group-containing vinyl monomer is 2 to 30 wt. %.

12. A polyorganosiloxane graft copolymer according to any one of claims 1 to 11, wherein the epoxy group-containing vinyl monomer is glycidyl methacrylate.

13. A polyorganosiloxane graft copolymer according to any one of claims 1 to 11, wherein the epoxy group-containing vinyl monomer is glycidyl acrylate.

14. A polyorganosiloxane graft copolymer having wet heat strength which is obtained by graft polymerizing one or more kinds of monomer which have ethylenically unsaturated bond and contain at least an epoxy group-containing vinyl monomer selected from the group consisting of glycidyl methacrylate, glycidyl acrylate, vinyl glycidyl ether, allyl glycidyl ether, glycidyl ether of hydroxyalkyl (meth)acrylate, glycidyl ether of polyalkylene glycol (meth)acrylate and glycidyl itaconate, onto a compound rubber in which a polyorganosiloxane rubber and a polyalkyl (meth)acrylate rubber have been inseparately united with each other, and in which the component derived from said epoxy-containing vinyl monomer is between about 1 wt. % and about 30 wt. % relative to the whole graft copolymer.

15. A polyorganosiloxane graft copolymer according to claim 14, wherein the monomer having an ethylenically unsaturated bond is selected from the group consisting of aromatic alkenyl, a vinyl compound, and mixtures thereof.

16. A polyorganosiloxane graft copolymer according to claim 15, wherein the monomer having an ethylenically unsaturated bond is selected from the group consisting of styrene, halogen-substituted styrene, alpha methylstyrene, vinyltoluene, vinylpyridine, methacrylate, 2-ethylhexyl methacrylate, methyl acrylate, ethyl acrylate, butyl acrylate, acrylonitrile, methacrylonitrile and combinations thereof.

17. A polyorganosiloxane graft copolymer according to claim 14, wherein the monomer having an ethylenically unsaturated bond is selected from the group consisting of acrylonitrile, styrene and mixtures thereof and the epoxy group-containing vinyl monomer is glycidyl methacrylate.

* * * * *